(12) United States Patent
Butters

(10) Patent No.: US 11,368,659 B2
(45) Date of Patent: Jun. 21, 2022

(54) SYSTEM AND METHOD OF REDUCING DISTORTION DURING DOWNSAMPLING

(71) Applicant: GRASS VALLEY LIMITED, Newbury (GB)

(72) Inventor: Jeffery R. Butters, Newbury (GB)

(73) Assignee: GRASS VALLEY LIMITED, Newbury (GB)

(*) Notice: Subject to any disclaimer, the term of this patent is extended or adjusted under 35 U.S.C. 154(b) by 0 days.

(21) Appl. No.: 17/207,123

(22) Filed: Mar. 19, 2021

(65) Prior Publication Data

US 2021/0211627 A1 Jul. 8, 2021

Related U.S. Application Data

(63) Continuation of application No. 16/935,659, filed on Jul. 22, 2020, now Pat. No. 10,958,886.

(60) Provisional application No. 62/878,253, filed on Jul. 24, 2019.

(51) Int. Cl.
| | |
|---|---|
| *H04N 9/64* | (2006.01) |
| *H04N 9/67* | (2006.01) |
| *H04N 9/69* | (2006.01) |
| *H04N 7/01* | (2006.01) |
| *H04N 11/02* | (2006.01) |

(52) U.S. Cl.
CPC ............ *H04N 9/646* (2013.01); *H04N 7/0117* (2013.01); *H04N 9/67* (2013.01); *H04N 9/69* (2013.01); *H04N 11/02* (2013.01)

(58) Field of Classification Search
CPC ...... H04N 7/0117; H04N 11/02; H04N 9/646; H04N 9/64; H04N 9/67; H04N 9/77; H04N 9/78; H04N 9/69

USPC ........ 348/624, 630, 612, 659, 661, 663, 666, 348/708, 675, 712, 713; 382/276, 275, 382/264; 345/647

See application file for complete search history.

(56) References Cited

U.S. PATENT DOCUMENTS

| | | |
|---|---|---|
| 2008/0101719 A1 | 5/2008 | Lim et al. |
| 2016/0005349 A1 | 1/2016 | Atkins et al. |

FOREIGN PATENT DOCUMENTS

| | | |
|---|---|---|
| GB | 2293514 A | 3/1996 |

OTHER PUBLICATIONS

International Search Report and Written Opinion for PCT/GB2020/051757, dated Oct. 30, 2020, 15 pages.

(Continued)

*Primary Examiner* — Sherrie Hsia

(74) *Attorney, Agent, or Firm* — ArentFox Schiff LLC

(57) ABSTRACT

A video processing system is provided for reducing distortion in video signals. The system includes a first transfer function that applies a transfer function to a received video signal to generate a gamma corrected video signal in a first color space; and a first matrix component that transforms the gamma corrected video signal in the first color space to a gamma corrected signal in a second color space, and extracts a luminance component from the gamma corrected signal in the second color space. Moreover, the system includes a second transfer function that generates a gamma corrected downsampled video signal in the first color space, and a second matrix component that transforms the gamma corrected video signal in the first color space to a gamma corrected video signal in the second color space, and extracts the chroma component in the second color space.

20 Claims, 5 Drawing Sheets

(56) References Cited

OTHER PUBLICATIONS

Strom, Jacob, et al., Chroma Adjustment for SDR Video, Joint Video Exploration Team (JVET) of ITU-T SG 16 WP 3 and ISO/IEC JTC 1/SC 29/WG 11, 7th Meeting, Torino, Italy, Jul. 13-21, 2017, 7 pages.

Strom, Jacob, et al., AhG on HDR and WCG: Chroma Adjustment for HDR Video, Joint Collaborative Team on Video Coding (JCT-VC) of ITU-T SG 16 WP 3 and ISO/IEC JTC 1/SC 29/WG 11, 26th Meeting: Geneva, CH, Jan. 12-20, 2017, 10 pages.

SYSTEM AND METHOD OF REDUCING DISTORTION DURING DOWNSAMPLING

CROSS REFERENCE TO RELATED APPLICATIONS

The present application is a continuation of U.S. patent application Ser. No. 16/935,659, filed Jul. 22, 2020, which claims priority to U.S. Provisional Patent Application No. 62/878,253, filed Jul. 24, 2019, the entire contents of which are hereby incorporated by reference.

TECHNICAL FIELD

The present disclosure generally relates to video processing, and, more particularly, to a system and method of reducing distortion during downsampling.

BACKGROUND

Typically, video signals, whether in the high dynamic range (HDR) or standard dynamic range (SDR) context, must be downsampled to a lower resolution in order to save storage and/or bandwidth during transmission. Color components (i.e., chroma components) are compressed by sampling them at a lower rate than the sampling applied to the brightness components (i.e., luma components). Downsampling video components requires the use of low-pass anti-aliasing filters. However, the filtering is performed on non-linear video signals, i.e., those signals that do not have a linear relationship to the amount of light that they will cause a display to emit. As a result, the video signal that is ultimately displayed is significantly distorted after the filtering because a non-linear transfer function was applied to the signal, and a linear filter was subsequently applied to the signal.

The problem arises from the fact that high-frequency information is filtered out of the color difference components. The magnitude of the luminance component can be significantly affected by applying a linear filter to a non-linear signal. FIG. 1 illustrates this case.

As shown in FIG. 1, a video signal is received at an opto-electronic transfer function (OETF) component that applies an optoelectronic transfer function (e.g., HDR OETF, SDR OETF or the like) to the signal. The output of the OETF converts linear scene light into a video signal in a first color space, for example, R'G'B'. Typically, this conversion occurs in a camera or other video device. A matrix transform component applies a matrix transformation to convert the signal from a first color space to a second color space, for example, from R'G'B' to Y'$C_B C_R$. The luma component (or gamma-adjusted/non-linear luminance), in this case, Y', is transferred to a display, and/or for further signal transmission. The chroma components, in this case, $C_B$ and $C_R$, are subjected to a low-pass filter after the non-linear transformation in order to be sampled at a lower resolution to reduce bandwidth without sacrificing excessive image quality (as measured, for example according to a predetermined threshold).

As noted above, because the linear filter is applied to the non-linear chroma components, resulting distortion occurs by applying the low-pass filter to the chroma components (e.g., $C_B C_R$). This sequence of video processing is standard across the industry, as prescribed by the SMPTE RP 177 standard. However, the distortion produced by this processing methodology is problematic and therefore there is a need for a system and method for reducing the distortion caused by chroma downsampling.

SUMMARY

Thus, according to an exemplary aspect, systems and methods are disclosed that are configured to reduce distortion from chroma downsampling.

In an exemplary aspect, a video processing system is provided for reducing distortion in video signals. The video processing system includes a video signal splitter configured to split a received video signal in a first color space as a first split signal and a second split signal; a first transfer function component configured to apply a transfer function to the first split signal to generate a gamma corrected video signal in the first color space; a first matrix component configured to transform the gamma corrected video signal in the first color space to a gamma corrected signal in a second color space, and configured to extract a luminance component from the gamma corrected signal in the second color space; a low-pass filter component configured to down sample the second split signal to generate a downsampled signal in the first color space; a second transfer function component configured to apply a transfer function to the down-sampled signal to generate a gamma corrected downsampled video signal in the first color space; a second matrix component configured to transform the gamma corrected downsampled video signal in the first color space to a gamma corrected downsampled video signal in the second color space, and configured to extract the chroma component of the gamma corrected downsampled signal in the second color space; and a multiplexer coupled to the first and second matrix components and configured to transmit at least one of the gamma corrected signal in the second color space and the gamma corrected downsampled signal in the second color space to a display device to be displayed thereon.

In another exemplary aspect, the received video signal is an RGB video signal in the first color space and the first and second split signals are identical signals for the RGB video signal.

In another exemplary aspect, the first transfer function component is configured to apply a non-linear transformation to the RGB video signal to generate an R'G'B' gamma corrected video signal.

In another exemplary aspect, the first matrix component is configured to apply a matrix transform to the R'G'B' gamma corrected video signal to extract a Y' (luma) component as the luminance component.

In another exemplary aspect, the second matrix component is configured to transform the RBG video signal in the first color space to a $C_B C_R$ signal.

In another exemplary aspect, the video signal splitter comprises a third matrix component configured to transform respective linear RGB components of the RGB video signal to linear LMS components that are split to provide the first and second split signals.

In another exemplary aspect, the system includes electronic memory and a processor configured to execute instructions stored on the electronic memory for providing the first transfer function for applying the transfer function to the first split signal; the first matrix component for transforming the gamma corrected video signal to the gamma corrected signal in the second color space and for extracting the luminance component; the second transfer function component for applying the transfer function to the down-sampled signal; and the second matrix component for transforming the gamma corrected downsampled video signal in the first color space and for extracting the chroma component of the gamma corrected downsampled signal.

In another exemplary embodiment, a video processing system is provided for reducing distortion in video signals. In this aspect, the video processing system includes a first transfer function component configured to apply a transfer function to a received video signal to generate a gamma corrected video signal in a first color space; a first matrix component configured to transform the gamma corrected video signal in the first color space to a gamma corrected signal in a second color space, and configured to extract a luminance component from the gamma corrected signal in the second color space; a low-pass filter component configured to down sample the received video signal to generate a downsampled signal in the first color space; a second transfer function component configured to apply a transfer function to the down-sampled signal to generate a gamma corrected downsampled video signal in the first color space; and a second matrix component configured to transform the gamma corrected downsampled video signal in the first color space to a gamma corrected downsampled video signal in the second color space, and configured to extract the chroma component of the gamma corrected downsampled signal in the second color space.

In another exemplary embodiment, a video processing system is provided for reducing distortion in video signals. In this aspect, the video processing system includes means for applying a transfer function to a received video signal to generate a gamma corrected video signal in a first color space; means for transforming the gamma corrected video signal in the first color space to a gamma corrected signal in a second color space; means for extracting a luminance component from the gamma corrected signal in the second color space; means for down sampling the received video signal to generate a downsampled signal in the first color space; means for applying a transfer function to the down-sampled signal to generate a gamma corrected downsampled video signal in the first color space; means for transforming the gamma corrected downsampled video signal in the first color space to a gamma corrected downsampled video signal in the second color space; and means for extracting the chroma component of the gamma corrected downsampled signal in the second color space.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

DETAILED DESCRIPTION

Figure 1:
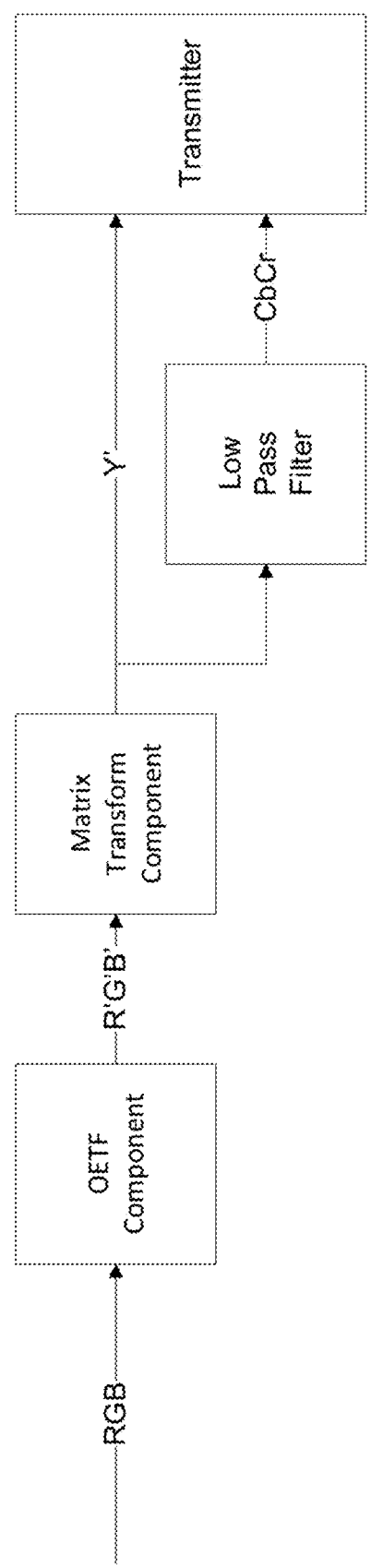
FIG. 1 is a block diagram of a conventional system of RGB to $Y'C_BC_R$ transformation.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

In general, High Dynamic Range ("HDR") is a relatively new technology being introduced by a number of standard organizations, such as Blu-ray Disc Association, ISO/IEC HEVC, ITU-R, SMPTE, CEA, and HDMI, as well as private companies, such Dolby and Philips. HDR displays provide a significant improvement over current display technology, such as Standard Dynamic Range ("SDR") displays and monitors. In particular, HDR devices produce a peak brightness that is an order of magnitude larger than SDR technology and a dynamic range that approaches the capabilities of a human observer. For example, SDR generally refers to displays of 0.05 to 100 nits (referring to candelas per square meter), while HDR refers to displays of anywhere between 0.0005-10,000 nits. HDR has a wider contrast range, with brighter whites and darker blacks. Additionally, HDR devices provide an enlarged color gamut and can reduce the motion blur in LCD systems, for example. Though the present disclosure applies to both HDR and SDR technologies, the distortion reduction is greater in HDR applications in some aspects.

Figure 2:
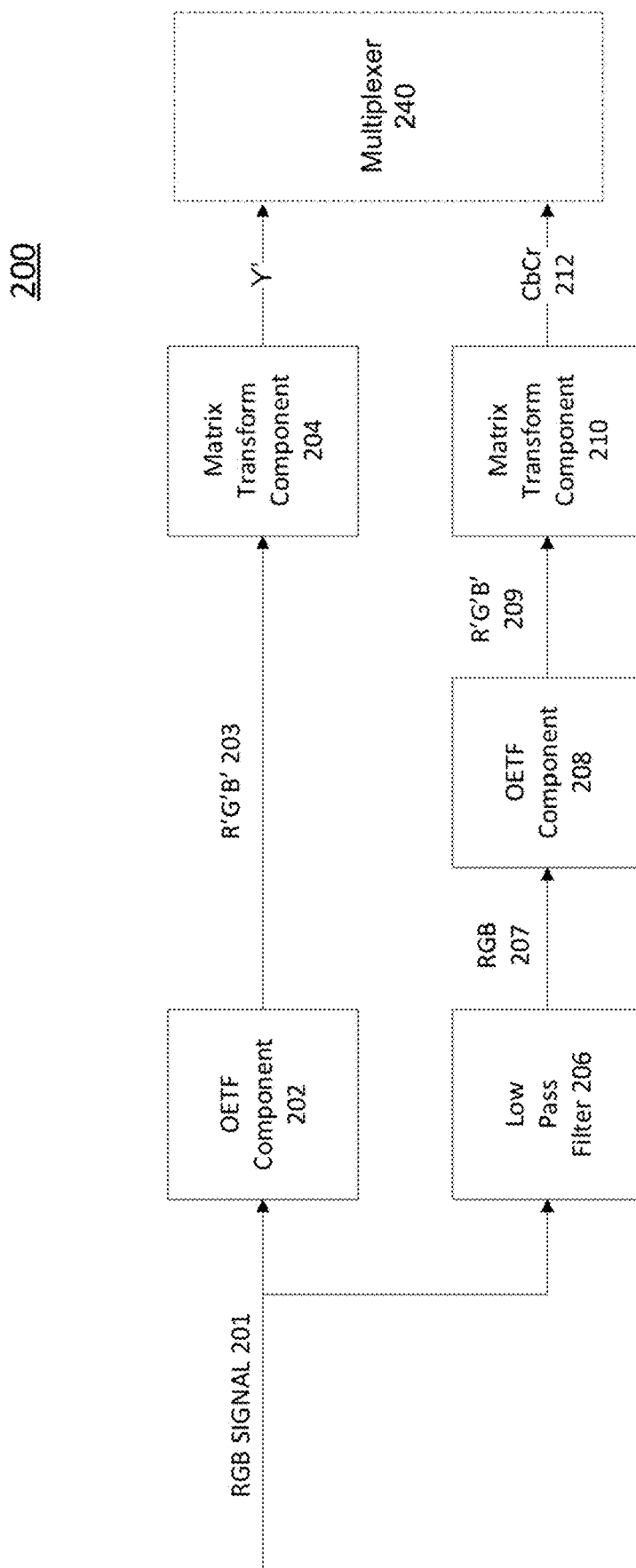
FIG. 2 is a block diagram of a system for reducing distortion during downsampling, according to an exemplary aspect of the disclosure.

FIG. 2 is a block diagram of a system 200 for reducing distortion during downsampling with color space transformation, according to an exemplary aspect of the disclosure.

As shown, FIG. 2 illustrates the reception of a signal 201 (e.g., an RGB video signal) in a first color space. In the description of FIG. 2, the signal 201 is assumed to be an RGB signal, though the present disclosure is not limited thereto. When received, the RGB signal 201 is split into two signals, using a signal splitter or the like. One signal of the split signal is transmitted to a transfer function component 202 that is configured to apply an OETF to the signal to convert the signal into an R'G'B' gamma corrected video signal 203 by applying a non-linear transformation to the signal. The other split signal 201 is transmitted to a low-pass filter 206. In exemplary aspects, the low-pass filter is a linear filter. In exemplary aspects, each split signal is identical to the originally received signal 201. The gamma correction adjusts the overall brightness of an RGB image by applying an optoelectronic transfer function, typically from a look-up table. A matrix transform component 204 is configured to apply a matrix transform to the R'G'B' signal 203 to extract the Y' (luma) component. Ultimately the Y' component is sent to a display 240, for storage, transmission, and/or to another video device for video processing, or the like. In exemplary aspects, the matrix component 204 may be a hardware or software component as described below.

As noted above, the RGB signal 201 is also subjected to a low-pass filter 206, separate from the transfer function component 202. Because the RGB signal is linear, the low-pass filter 206 reduces the resolution of the RGB signal 201 without introducing distortion, generating a new signal RGB 207. In some aspects, the low-pass filter 206 may be a software or a hardware component, or a combination thereof. Subsequently, the RGB signal 207 is subject to a second OETF component 208 that applies an OETF to the RGB signal 207, to generate R'G'B' signal 209. In some embodiments, the OETF component 208 is equivalent to the transfer function component 202 that applies the OETF, while in other aspects the OETF components may apply substantially the same OETFs to each signal, configurable by design. Matrix transform component 210 is configured to transform the R'G'B' signal 209 to a $C_B C_R$ to generate signal $C_B C_R$ signal 212. The $C_B C_R$ signal 212 is passed, optionally, to the multiplexer 240 for display, storage, transmission, and/or for further video processing. In one aspect, the luma component Y' and the chroma component $C_B C_R$ can be multiplexed by the multiplexer 240 and transmitted down a co-axial or fiber transmission cable as a standard SDI signal, for video editing, processing, transmission, display or the like. Advantageously, the multiplexed signal that is transmitted, stored, processed or displayed consumes significantly less bandwidth on a network, and additionally contains significantly less distortion than the output signal in the conventional methodology of FIG. 1 described above because the linear low-pass filter 206 is applied to the linear signal 201. When the multiplexed signal is displayed, less distortion is visible than in signals produced by previous systems such as system 100, resulting in a clearer picture for processing, editing or viewing. In exemplary aspects, the matrix transform component 210 and other components of system 200 may be implemented as hardware or software components.

Placing the OETF 208 after the low-pass filter 206 may appear to violate the rules of sampling theory by adding out of band components due to harmonic distortion. However, these additional harmonics are removed when the combined luma and chroma signals are displayed, when the signal is converted back to linear light. In exemplary aspects, the disclosed techniques may be implemented in an FPGA, ASIC, software (e.g., MATLAB, EXCEL, etc.), though other implementations are also contemplated. If the RGB signal 200 originates with the transfer function already applied, the RGB signal 200 may be converted back to a linear signal to generate the color difference components $C_B$ and $C_R$.

In exemplary aspects of the disclosure, the chroma components $C_B C_R$ are sampled at half the rate of the luma Y' samples, referred to as 4:2:2 sampling. In other aspects, however, 4:2:0 sampling may also be used, wherein the larger filters (i.e., those with larger apertures) are also used. In exemplary aspects, 4:2:0 has twice the horizontal and half the vertical resolution of 4:1:1, prompting the use of the larger filters. As the $C_B$ and $C_R$ channels are only sampled on each alternate line in this scheme, the vertical resolution is halved. The data rate is thus the same. The improvement due to the aspects described herein may be greater in 4:1:1 and 4:2:0 because of the use of larger filters.

In general, $IC_T C_P$ is a color representation for high dynamic range and wide color gamut imagery. In an exemplary aspect, the matrix transform components 204 and 210 are configured to transform the R'G'B' signals to Dolby's $IC_T C_P$ (or other color spaces) instead of $Y'C_B C_R$ for significantly better distortion reduction. This is because $IC_T C_P$ is a "nearly constant" luminance system so that changes in color components have less effect on brightness than for $Y'C_B C_R$. Moreover, $IC_T C_P$ may show smaller distortions (when converting 4:4:4 to 4:2:2) in downsampling as compared to $Y'C_B C_R$, so removing a fixed amount of distortion could remove a larger proportion of the overall distortion. However, in order to transform RGB to $IC_T C_P$ an intermediate transform from RGB to long, medium and short wavelength (LMS) color space may first be performed.

Figure 3:
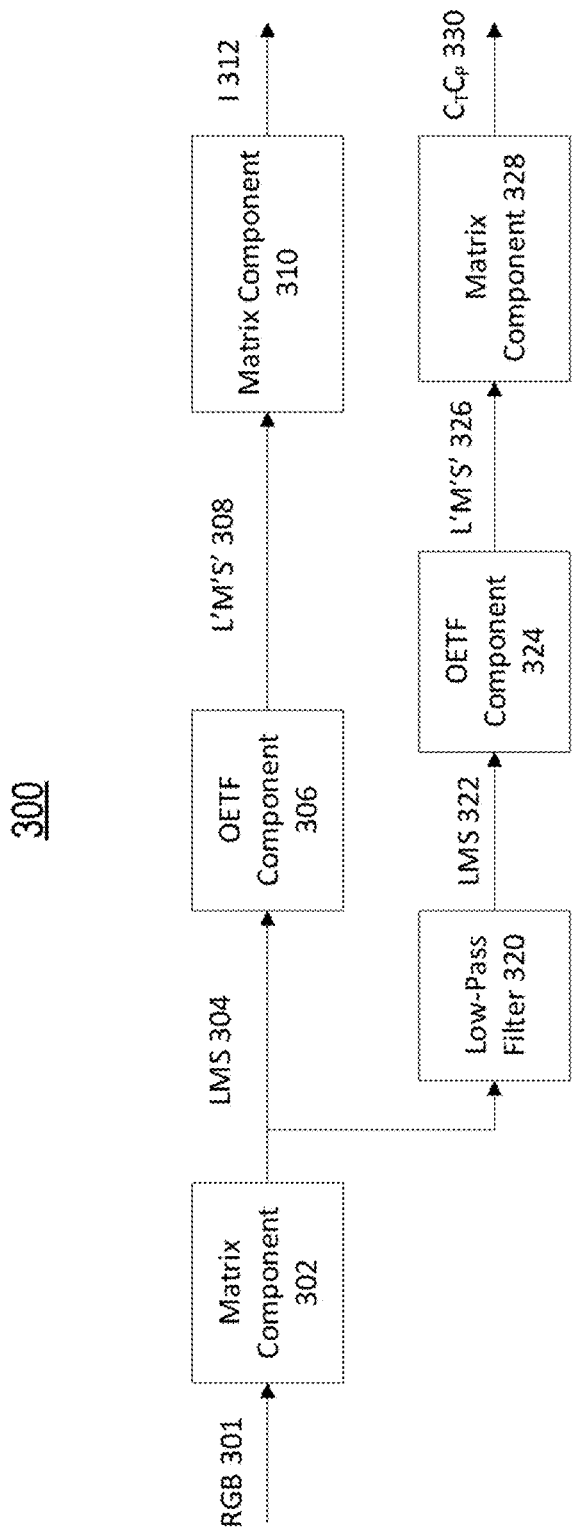
FIG. 3 is a block diagram of another system for reducing distortion during downsampling in the ICtCp color space, according to an exemplary aspect of the disclosure.

FIG. 3 illustrates a block diagram for a system 300, in accordance with exemplary aspects of the present disclosure. The linear RGB signal 301 is received at an RGB to LMS Matrix component 302, which is in turn configured to apply a matrix that transforms the linear RGB components of the RGB signal 301 to linear LMS components forming LMS signal 304. The LMS signal is split and transmitted to an OETF Component 306 that performs gamma adjustment to generate the gamma adjusted L'M'S' signal 308. In one aspect, the matrix component 302 can be a video processing element of the video signal splitter. Subsequently, a matrix transform is applied to the L'M'S' signal 308 by the matrix component 310 to generate the luminance I signal 312. Synchronously or asynchronously, the split LMS signal 304 is routed to low-pass filter 320 that is configured to downsample to generate the down-sampled LMS signal 322. An OETF component 324 applies the OETF to the LMS signal 322 to perform gamma adjustment, generating L'M'S' 326. In exemplary aspects, the OETF component 306 and the OETF component 324 apply the same or substantially the same OETF. Subsequently, the matrix component 328 applies a matrix transform that transforms the components of the L'M'S' signal 326 to chroma CtCp signal 330. The I signal 312 and the CtCp signal 330 may be multiplexed and transmitted for further processing, stored, displayed or the like. In some aspects, the multiplexed signal may be transmitted down a co-axial or fiber transmission cable as a standard SDI signal. The SDI signal may be displayed on a standard video device, an editing device, or other video broadcast, transmission or display equipment, where the picture has significantly less distortion than previous configurations such as the system 100 of FIG. 1

Typically, received video signals already have non-linear transfer functions on the signals. The system 200 shown in FIG. 2 uses more components than previously known configurations, but provides significantly more reduction of distortion as compared to placing the low-pass filter after the transfer function as shown in FIG. 1.

Figure 4:
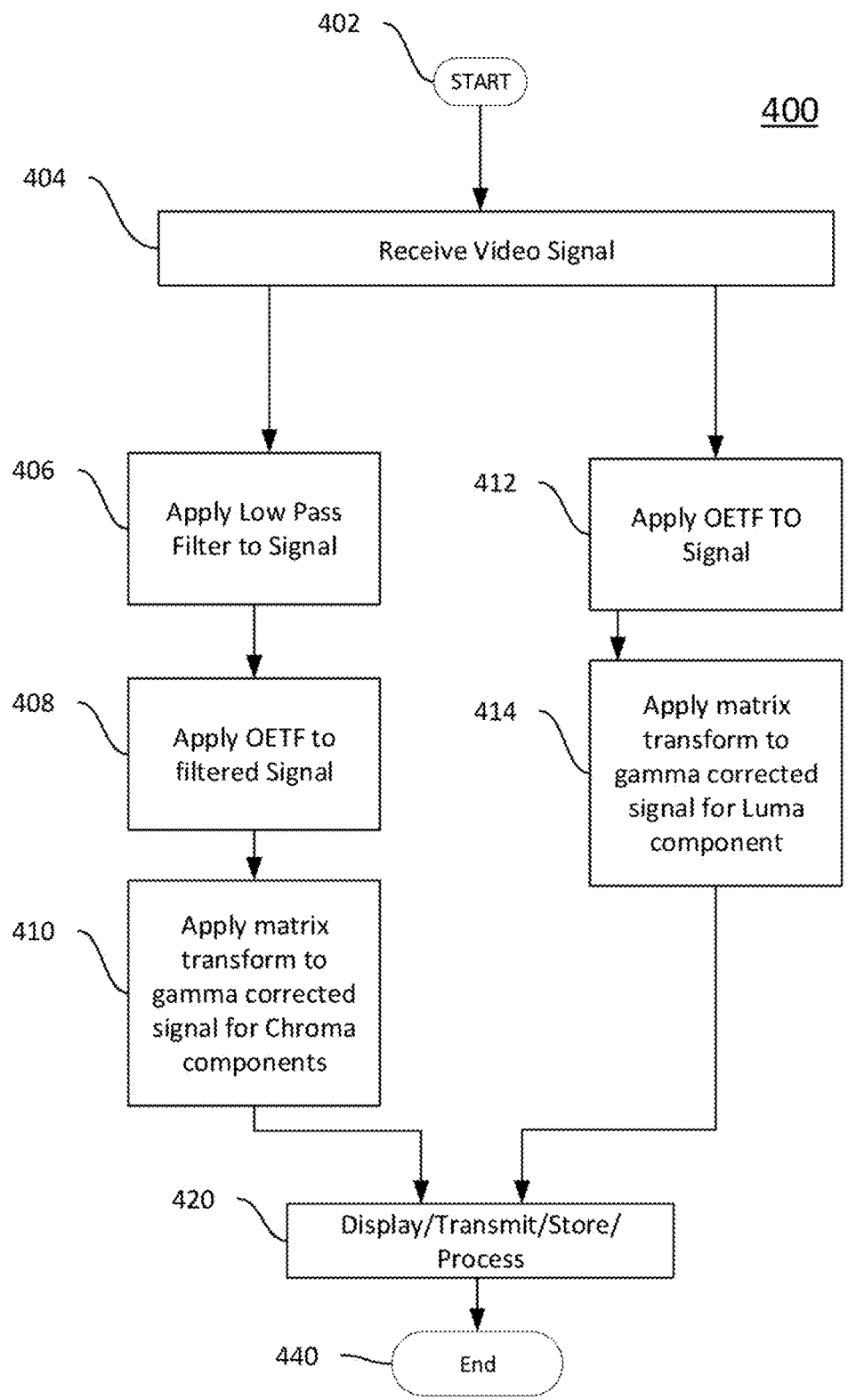
FIG. 4 is a flow diagram of a method for reducing distortion in downsampling, in accordance with an exemplary aspect of the present disclosure.

FIG. 4 is a flow diagram illustrating method 400 for reducing distortion during downsampling, according to an exemplary aspect of the disclosure. It should be appreciated that method 400 can be executed using the system described above with respect to FIG. 2 or FIG. 3, for example.

As shown, the method begins at 402 and proceeds to 404. At 404, a video signal (e.g., RGB signal 201) in a first color space (e.g., RGB) is received, for example, at a video processing device, an FPGA, ASIC or the like. In one example, the video signal can be media content captured by a camera at a live event (e.g., a sports game), which is then transmitted to system 200 or 300 for processing according to the exemplary aspects described herein.

Upon receiving the video signal, the method then proceeds in two separate branches/paths to steps 406 and 412, in parallel or sequentially according to various aspects. In aspects where the signal will be transformed to $IC_T C_P$ color space, matrix component 302 transforms the RGB signal to an LMS signal using a matrix transform. In the first branch, at step 406, low-pass filter (e.g., low-pass filter 206 or 320) is applied to the signal. In exemplary aspects the low-pass filter is a linear filter that downsamples the received signal, configuring the signal for storage, transmission or the like, reducing consumed bandwidth or storage space.

The method then proceeds to 408, where an OETF component (e.g., 208 or 324) applies an opto-electronic transfer function to the filtered/downsampled signal to generate a gamma corrected signal (e.g., R'G'B'). In exemplary aspects the OETF component is a hardware and/or software component that applies the OETF to the signal (or a sample of the signal) by performing a lookup in a lookup-table where the key is linear brightness and the associated value is brightness with gamma.

At 410, a matrix transform component transforms the gamma corrected signal (e.g., R'G'B' or L'M'S' signal) to a second color space for the chroma components (e.g., $C_B$ and $C_R$, or, respectively, $C_T C_P$). In exemplary aspects, component 210 may be applied to transform R'G'B' to $C_B$ and $C_R$, and component 328 can be used to transform L'M'S' to $C_T C_P$). Transforming the RGB signal to $IC_T C_P$ (or other color spaces) instead of $Y'C_B C_R$ may result in significantly better distortion reduction. This is because $IC_T C_P$ is a "nearly constant" luminance system so that changes in color components have less effect on brightness than for $Y'C_B C_R$. $IC_T C_P$ may show smaller distortions (when converting 4:4:4 to 4:2:2) in downsampling as compared to $Y'C_B C_R$, so removing a fixed amount of distortion could remove a larger proportion of the overall distortion.

In the second branch executing synchronously, or asynchronously with the first branch, the method proceeds to 412, where OETF component (e.g., 202 or 306) applies an OETF to the received RGB signal or transformed LMS signal to generate a gamma adjusted signal. At 414, a matrix transformation component is configured to transform the gamma adjusted signal to the luma component (Y' or I) by applying a color space matrix transform to the signal.

At 420, the luma (e.g., Y' or I) and chroma ($C_B$ and $C_R$ or $C_T$ and $C_P$) components are multiplexed and provided for transmission, storage, display, and/or to another video device for further processing with significantly reduced distortion as compared to the conventional methodology described above with respect to FIG. 1. The method terminates at 440.

In general, it should be appreciated that the methods, devices, processing, and logic described above may be implemented in many different ways and in many different combinations of hardware and software. For example, all or parts of the implementations may be circuitry that includes an instruction processor, such as a Central Processing Unit (CPU) as shown in the computer system in FIG. 5, microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

Figure 5:
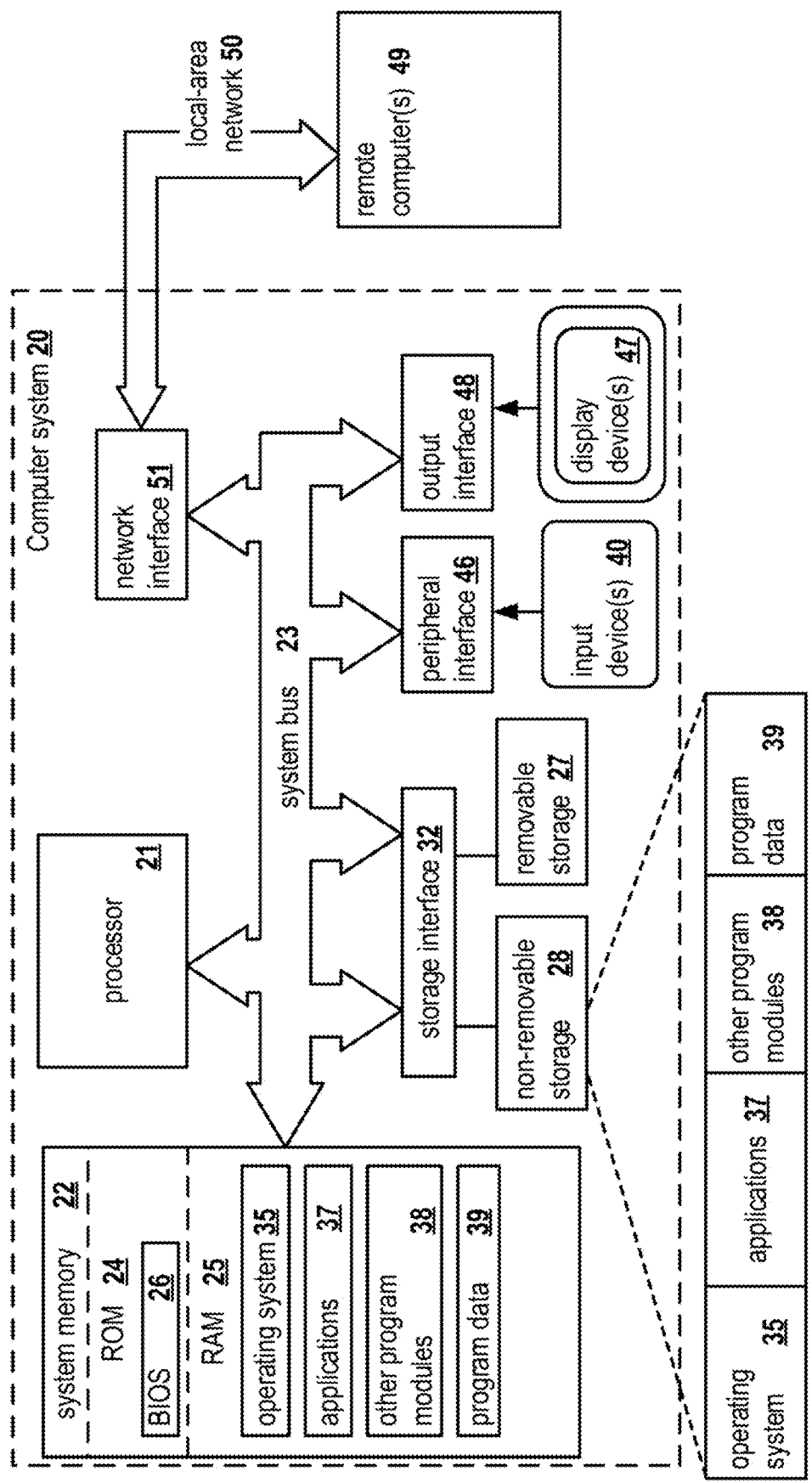
FIG. 5 is a block diagram illustrating a computer system on which aspects of systems and methods of reducing distortion in downsampling may be implemented in accordance with an exemplary aspect.

In one exemplary aspect, FIG. 5 is a block diagram illustrating a computer system 20 on which aspects of systems and methods of reducing distortion in chroma downsampling. It should be noted that the computer system 20 can correspond to the system 100 or any components therein. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices. In an exemplary aspect, the display device 47 can be configured to receive the processed signals from multiplexer 240, as described above, the display the signals thereon.

Moreover, the computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A video processing system for reducing distortion in video signals, the video processing system comprising:
   a low-pass filter configured to down sample a video signal in a first color space to generate a down-sampled video signal in the first color space;
   a first transfer function configured to generate a gamma corrected video signal in the first color space from the video signal;
   a second transfer function configured to generate a gamma corrected down-sampled video signal in the first color space from the generated down-sampled video signal;
   at least one matrix component configured to generate a gamma corrected video signal in a second color space from the gamma corrected video signal in the first color space, and to generate a gamma corrected down-sampled video signal in the second color space from the gamma corrected down-sampled video signal; and
   an output configured to transmit at least one of the gamma corrected video signal in the second color space and the gamma corrected down-sampled video signal in the second color space to a display device to be displayed thereon.

2. The video processing system according to claim 1, further comprising:
   a video signal splitter configured to split the video signal to a first split signal and a second split signal,
   wherein the first transfer function applies a transfer function to the first split signal to generate the gamma corrected video signal in the first color space, and
   wherein the low-pass filter down samples the second split signal as the video signal in the first color space to generate the down-sampled video signal in the first color space.

3. The video processing system according to claim 2, wherein the at least one matrix is configured to extract a luminance component from the gamma corrected video signal in the second color space, and to extract a chroma component of the gamma corrected down-sampled video signal in the second color space.

4. The video processing system according to claim 3, wherein the video signal is an RGB video signal in the first color space and the first and second split signals are identical signals for the RGB video signal.

5. The video processing system according to claim 4, wherein the first transfer function is configured to apply a non-linear transformation to the RGB video signal to generate an R'G'B' gamma corrected video signal.

6. The video processing system according to claim 5, wherein the at least one matrix component is configured to:
   apply a matrix transform to the R'G'B' gamma corrected video signal to extract a Y' (luma) component as the luminance component; and
   transform the RGB video signal in the first color space to a CBCR signal.

7. The video processing system according to claim 4, wherein the video signal splitter comprises a third matrix component configured to transform respective linear RGB components of the RGB video signal to linear LMS components that are split to provide the first and second split signals.

8. The video processing system according to claim 1, further comprising electronic memory and a processor configured to execute instructions stored on the electronic memory for providing the first transfer function to generate the gamma corrected video signal in the first color space from the video signal, the second transfer function to generate the gamma corrected down-sampled video signal in the first color space, and the at least one matrix component to generate the gamma corrected video signal in the second color space and the gamma corrected down-sampled video signal in the second color space.

9. A video processing system for reducing distortion in video signals, the video processing system comprising:
   a filter configured to down sample a video signal in a first color space to generate a down-sampled video signal in the first color space;
   a first transfer function configured to transform the video signal to a gamma corrected video signal in the first color space;
   a second transfer function configured to transform the generated down-sampled video signal to a gamma corrected down-sampled video signal in the first color space; and
   at least one matrix component configured to generate a gamma corrected video signal in a second color space from the gamma corrected video signal in the first color space, and to generate a gamma corrected down-sampled video signal in the second color space from the gamma corrected down-sampled video signal.

10. The video processing system according to claim 9, further comprising a multiplexer configured to transmit at least one of the gamma corrected video signal in the second color space and the gamma corrected down-sampled video signal in the second color space to a display device to be displayed thereon.

11. The video processing system according to claim 9, further comprising:
   a video signal splitter configured to split the video signal to a first split signal and a second split signal,
   wherein the first transfer function applies a transfer function to the first split signal to generate the gamma corrected video signal in the first color space, and
   wherein the filter down samples the second split signal as the video signal in the first color space to generate the down-sampled video signal in the first color space.

12. The video processing system according to claim 11, wherein the at least one matrix is configured to extract a luminance component from the gamma corrected video signal in the second color space, and to extract a chroma component of the gamma corrected down-sampled video signal in the second color space.

13. The video processing system according to claim 12, wherein the video signal is an RGB video signal in the first color space and the first and second split signals are identical signals for the RGB video signal.

14. The video processing system according to claim 13, wherein the first transfer function is configured to apply a non-linear transformation to the RGB video signal to generate an R'G'B' gamma corrected video signal.

15. The video processing system according to claim 14, wherein the at least one matrix component is configured to:
   apply a matrix transform to the R'G'B' gamma corrected video signal to extract a Y' (luma) component as the luminance component; and transform the RGB video signal in the first color space to a CBCR signal.

16. The video processing system according to claim 13, wherein the video signal splitter comprises a third matrix component configured to transform respective linear RGB components of the RGB video signal to linear LMS components that are split to provide the first and second split signals.

17. The video processing system according to claim 9, further comprising electronic memory and a processor configured to execute instructions stored on the electronic memory for providing the first transfer function to generate the gamma corrected video signal in the first color space from the video signal, the second transfer function to generate the gamma corrected down-sampled video signal in the first color space, and the at least one matrix component to generate the gamma corrected video signal in the second color space and the gamma corrected down-sampled video signal in the second color space.

18. A video processing system for reducing distortion in video signals, the video processing system comprising:
  means for down sampling a video signal in a first color space to generate a down-sampled video signal in the first color space;
  means for transforming the video signal to a gamma corrected video signal in the first color space;
  means for transforming the generated down-sampled video signal to a gamma corrected down-sampled video signal in the first color space;
  means for generating a gamma corrected video signal in a second color space from the gamma corrected video signal in the first color space; and
  means for generating a gamma corrected down-sampled video signal in the second color space from the gamma corrected down-sampled video signal.

19. The video processing system according to claim 18, further comprising means for transmitting at least one of the gamma corrected video signal in the second color space and the gamma corrected down-sampled video signal in the second color space to a display device to be displayed thereon.

20. The video processing system according to claim 19, further comprising:
  means for extracting a luminance component from the gamma corrected video signal in the second color space; and
  means for extracting a chroma component of the gamma corrected down-sampled video signal in the second color space.

* * * * *

UNITED STATES PATENT AND TRADEMARK OFFICE
CERTIFICATE OF CORRECTION

PATENT NO.        : 11,368,659 B2
APPLICATION NO.   : 17/207123
DATED             : June 21, 2022
INVENTOR(S)       : Jeffrey R. Butters Page 1 of 1

It is certified that error appears in the above-identified patent and that said Letters Patent is hereby corrected as shown below:

On the Title Page

Please correct as follows:
Under (*) Notice please add the following:
-- This patent is subject to a Terminal Disclaimer. --

Signed and Sealed this
Sixth Day of September, 2022

*Katherine Kelly Vidal*

Katherine Kelly Vidal
*Director of the United States Patent and Trademark Office*